United States Patent [19]

Kagata

[11] 4,123,951
[45] Nov. 7, 1978

[54] DIFFERENTIAL GEAR MECHANISM FOR VEHICLES

[75] Inventor: Tooru Kagata, Toyota, Japan

[73] Assignee: Aisin Seiki Kabushiki Kaisha, Aichi, Japan

[21] Appl. No.: 751,673

[22] Filed: Dec. 17, 1976

[30] Foreign Application Priority Data

Dec. 19, 1975 [JP] Japan .............................. 50/152330
Apr. 9, 1976 [JP] Japan .............................. 51/40591
Jun. 10, 1976 [JP] Japan .............................. 51/75463[U]

[51] Int. Cl.² ............................................. F16H 1/44
[52] U.S. Cl. .................................................... 74/711
[58] Field of Search ................... 74/711; 192/93 A, 49

[56] References Cited

U.S. PATENT DOCUMENTS

| | | | |
|---|---|---|---|
| 3,362,258 | 1/1968 | Thornton | 74/711 |
| 3,369,428 | 2/1968 | Hughson | 192/93 A X |
| 3,650,349 | 3/1972 | Cleveland et al. | 74/711 X |
| 3,906,812 | 9/1975 | Kagata | 74/711 |

FOREIGN PATENT DOCUMENTS

1,260,168   1/1972   United Kingdom ........................ 74/711

*Primary Examiner*—Samuel Scott
*Assistant Examiner*—Lance W. Chandler
*Attorney, Agent, or Firm*—Oblon, Fisher, Spivak, McClelland & Maier

[57] ABSTRACT

A differential gear mechanism for vehicles includes an axle shaft, a case rotated by the driving force from an engine, a pinion shaft perpendicularly intersecting the rotational axis of the case and fixed thereto, at least one pair of pinion gears rotatably supported upon the pinion shaft and supported by the case, a pair of side gears disposed within the case and enmeshed with the pair of pinion gears at both sides thereof for transmitting the driving force to the axle shaft, and a pair of pressure plates disposed exteriorly of the pair of side gears and slidably engaged with an inner peripheral face of the case at an outer peripheral face thereof. The pressure plates also support the pair of side gears and have a cam portion which is formed by end portions which extended inwardly of the case from the pair of pressure plates and from the outsides of the pair of side gears. A clutch mechanism is also interposed between the pair of pressure plates and the inner side of the case and is engaged with the pair of side gears at the inner surface thereof and with the pair of pressure plates at the outer side thereof.

3 Claims, 12 Drawing Figures

PRIOR ART

DIFFERENTIAL GEAR MECHANISM FOR VEHICLES

BACKGROUND OF THE INVENTION

1. Field of the Invention

This invention relates generally to a differential gear mechanism for vehicles.

2. Description of the Prior Art

Conventionally, various constructions of differential gear mechanisms are known. One type of differential gear mechansims is shown in FIGS. 11 and 12 and is seen to comprise a pair of pressure plates 25' and 26' as means for supplying the pressure force against a pair of clutches, not shown, disposed within a case 10', the same being pressed and actuated upon both sides thereof by means of a camming operation generated by means of the relative rotation between edge portions 25'a and 26'a formed upon the pressure plates 25' and 26', and a pinion shaft 15'. In this mechanism, the cam portion is defined within a limited space of the case 10' between namely, the edge portion 25'a and 26'a of the pressure plate 25' and 26' and the pinion shaft 15' and is located outwardly of the pinion gear 16' so that the thickness of the case 10' is rendered quite thin.

Another differential gear mechanism is such that the cam portion is not enclosed or disposed within the case, but the case has a recessed portion and the outer surface of the cam portion is similarly constructed with the outer surface of the casing. However, the intensity of the casing is reduced, and the capacity of the transmitting power of the whole mechanism is lowered.

SUMMARY OF THE INVENTION

It is therefore an object of the present invention to provide a differential gear mechanism for vehicles for obviating the above-mentioned conventional drawbacks.

It is another object of the present invention to provide a unique and highly simplified differential gear mechanism for vehicles.

BRIEF DESCRIPTION OF THE DRAWINGS

Various objects, features and attendant advantages of the present invention will be more fully appreciated as the same becomes better understood from the following detailed description of the present invention when considered in connection with the accompanying drawings, in which.

DETAILED DESCRIPTION OF THE ILLUSTRATED EMBODIMENTS

Figure 1:
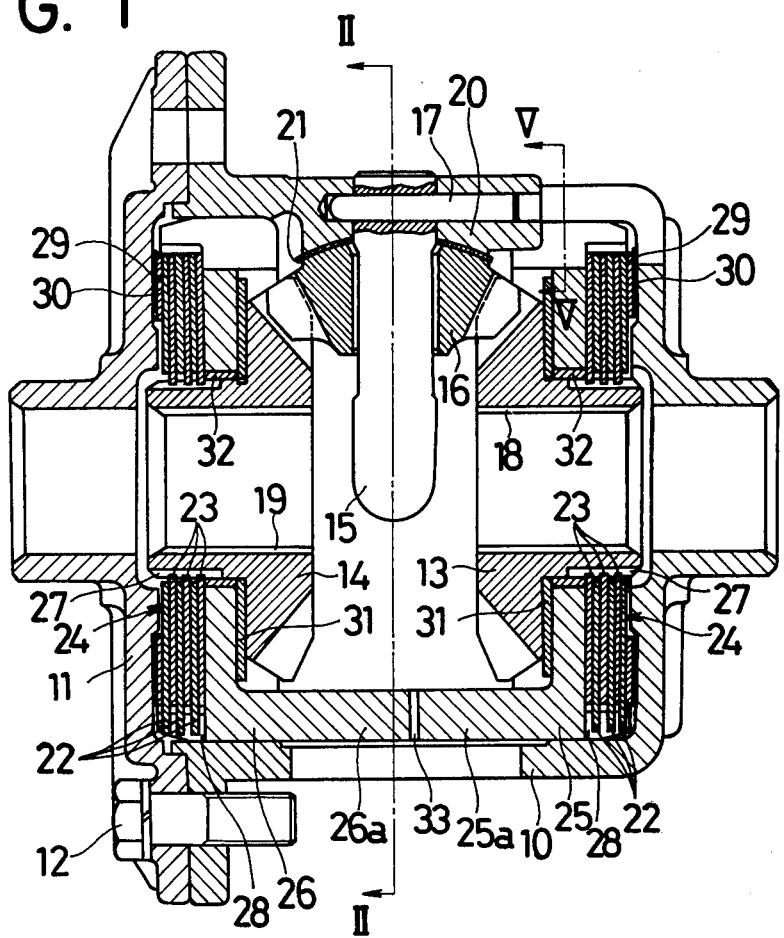
FIG. 1 is a sectional view taken along the line I—I of FIG. 2, showing a differential gear mechanism constructed according to this invention.
Figure 3:
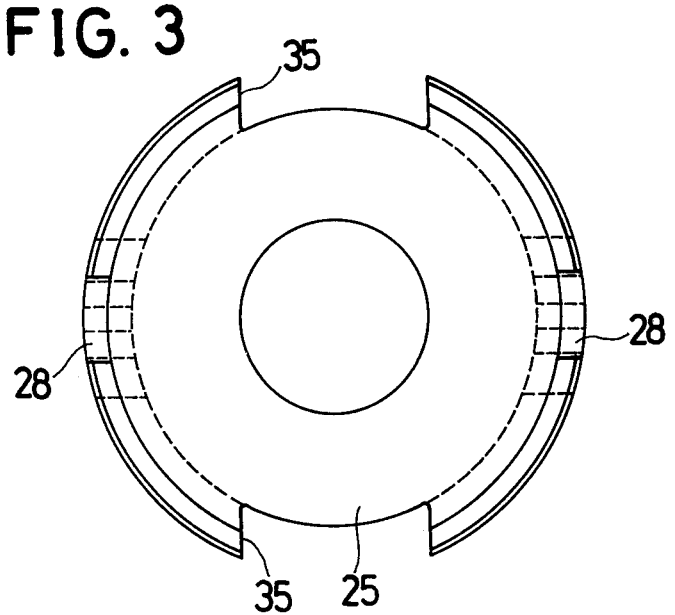
FIG. 3 is a front view showing one of the pressure plates of the mechanism of FIG. 1.
Figure 2:
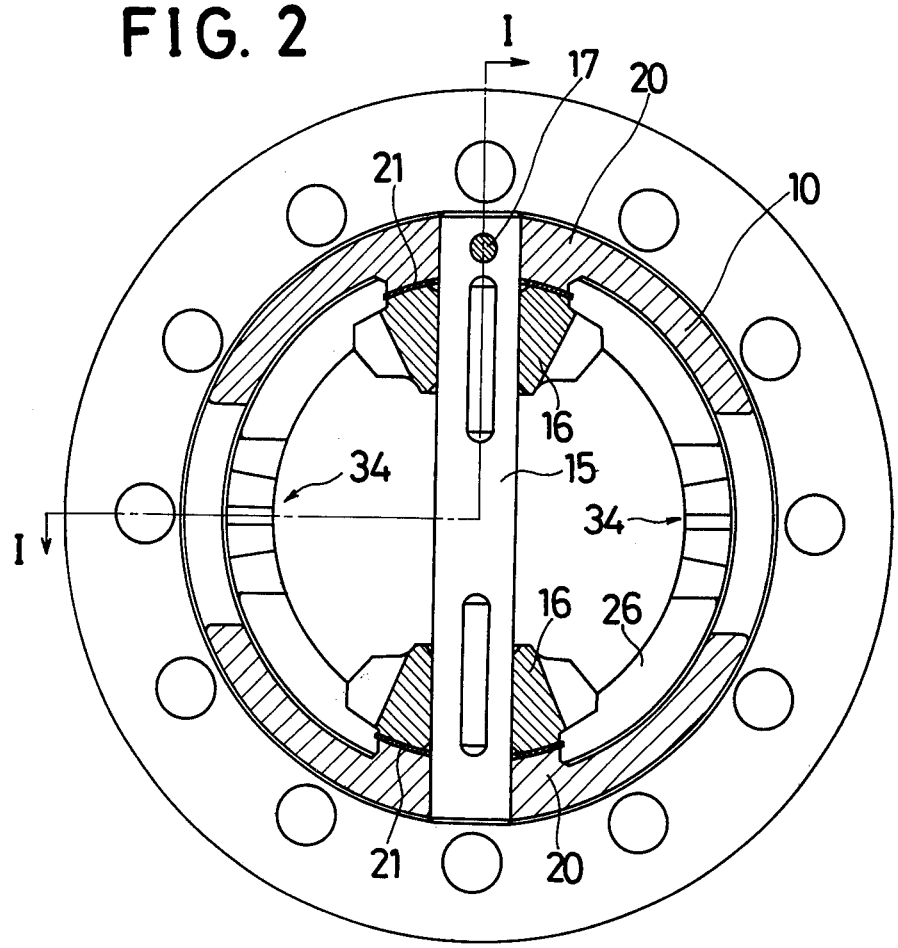
FIG. 2 is a view similar to that of FIG. 1 and taken along the line II—II of FIG. 1.

Referring now to the drawings, and more particularly to FIGS. 1-5 thereof, a gear case is shown at 10 and a cover 11 is secured thereon by means of a plurality of bolts 12, the flanged portion of case 10 and cover 11 being operatively engaged with a ring gear, not shown, in a conventinal manner.

A pair of side gears 13 and 14 are disposed opposite each other and at least a pair of pinion gears 16 are disposed within the case 10 so as to be engaged with gears 13 and 14. The pinion gears 16 are rotatably supported upon opposite ends of a pinion shaft 15 which is in turn rotatably mounted upon case 10 at both ends thereof. A thrust washer 21 is interposed between the back face of each pinion gear 16 and a portion 20 of the case 10 for receiving the thrust force from the pinion gears 16, and the side gears 13 and 14 are connected to axle shafts, not shown, through means of inner splines 18 and 19 thereof, respectively.

A clutch 24, having a plurality of outer clutch plates or discs 22 and a plurality of inner plates or discs 23 coaxially mounted with the side gears 13 and 14 and pressure plates 25 and 26, is interposed between the case 10 and the side gears 13 and 14, respectively. The inner clutches 23 are axially and slidably engaged with a slot 27 of the side gears 13 and 14, and the outer clutches 22 are axially and slidably engaged with a slit 28 of the pressure plates 25 and 26. A pre-load spring 29 and a shim 30 are interposed between each of the clutches 24 and the case 10, and thrust washers 31 are likewise interposed between the pressure plates 25 and 26 and the side gears 13 and 14 which are rotatably supported by means of bushes 32.

Figure 4:
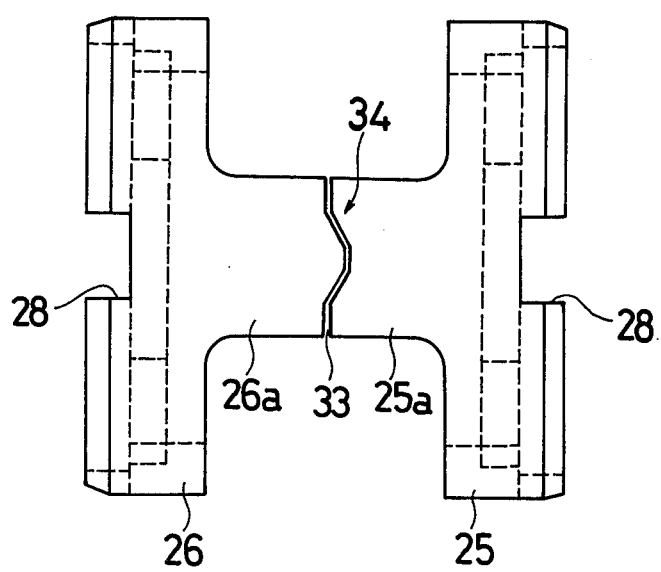
FIG. 4 is a side view showing both pressure plates of the present invention as operatively disposed.
Figure 5:
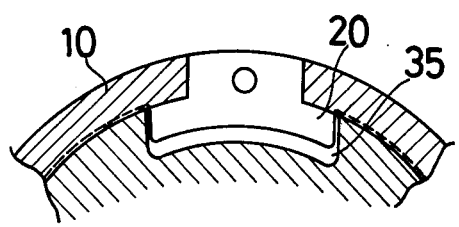
FIG. 5 is a partial view of FIG. 1 and taken along the line V—V of FIG. 1.
Figure 10:
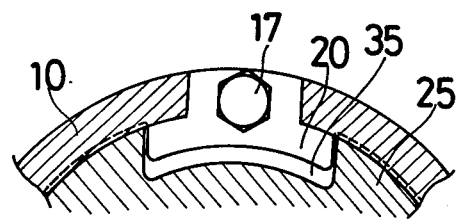
FIG. 10 is a view similar to that of FIG. 5 and taken along the line V—V of FIG. 6.
Figure 11:
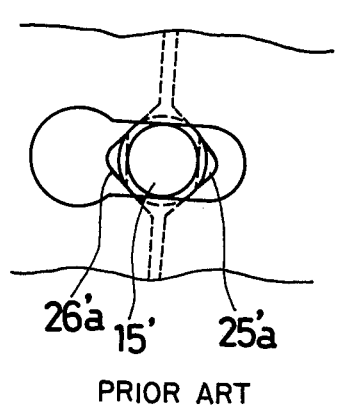
FIG. 11 is a plan view, showing a conventional differential gear mechanism.
Figure 12:
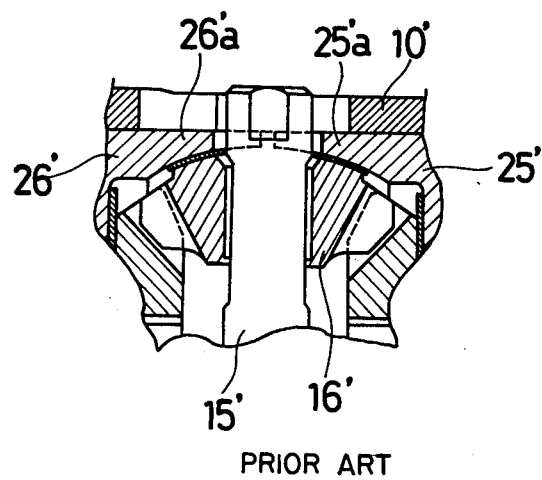
FIG. 12 is a partial cross-sectional view of the conventional differential gear mechanism of FIG. 11.
Figure 6:
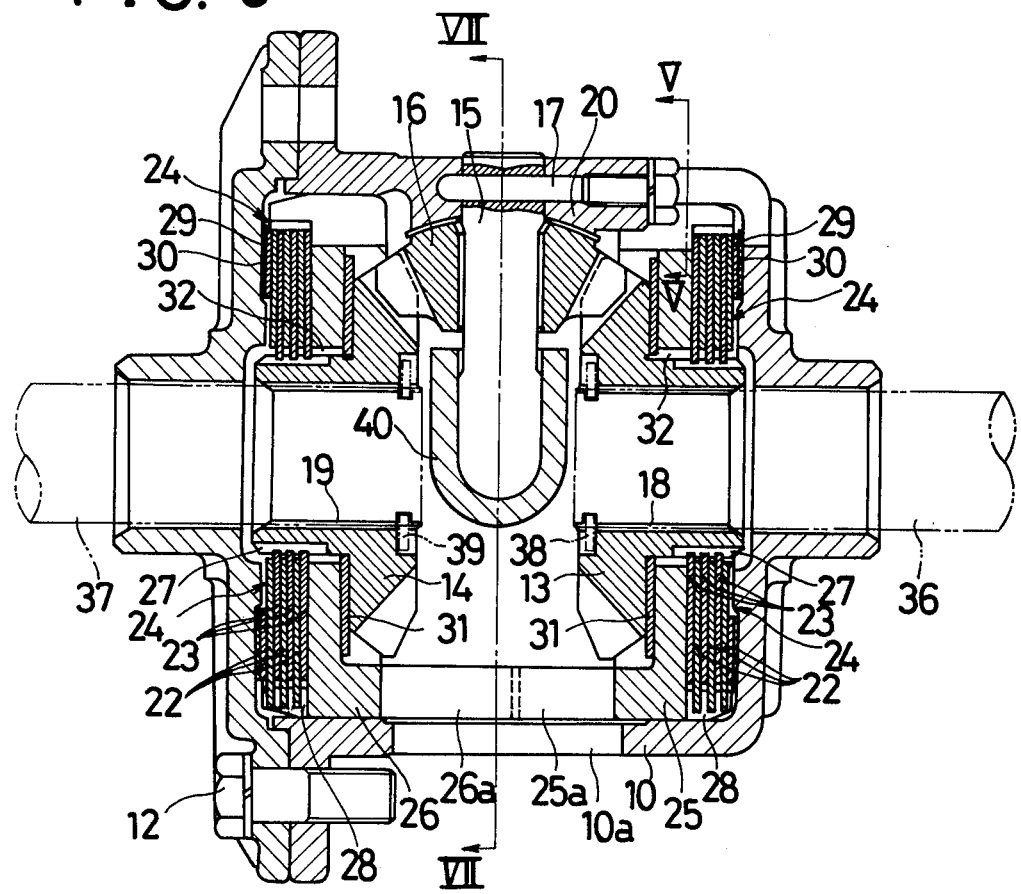
FIG. 6 is a view similar to that of FIG. 1, and taken along the line VI—VI of FIG. 7 showing however, a second embodiment constructed according to this invention.
Figure 8:
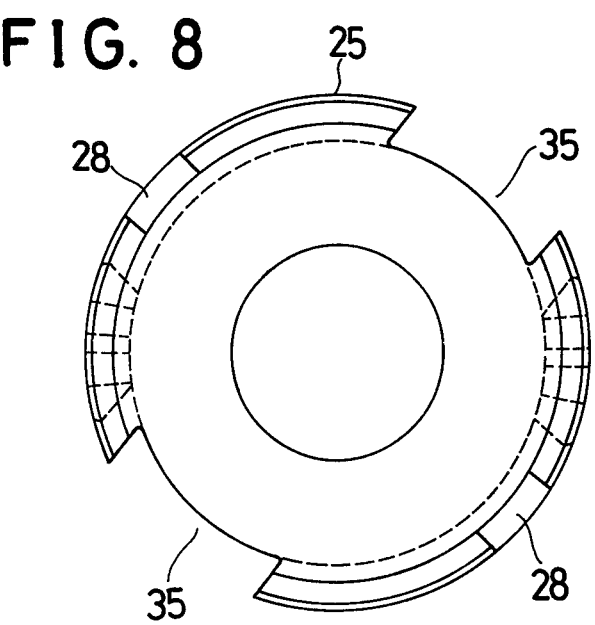
FIG. 8 is a view similar to that of FIG. 3.

The pressure plates 25 and 26 are provided with end portions 25a and 26a which project therefrom in opposite directions, and these end portions 25a and 26a are disposed opposite each other with a gap 33 always defined therebetween so as not to contact each other, as clearly seen in FIG. 4. A cam portion 34 is formed upon the end portions 25a and 26a of pressure plates 25 and 26 so as to axially displace plates 25 and 26 as a result of such portions contacting each other and rotating the opposed faces of end portions 25a and 26a relative to each other upon relative rotation of pressure plates 25 and 26 and upon shifting both opposed faces of end portions 25a and 26a.

The outer surfaces of pressure plates 25 and 26 are slidably contacted with the inner side or surface of case 10 and the end portions 25a and 26a of pressure plates 25, 26 are of course disposed within the case 10. A recess portion 35 is formed upon the outer circumferential portion of pressure plate 25, as clearly seen in FIG. 5, and the end portion of portion 20 of case 10 is engaged with the recess portion 35 so as to thereby cause pressure plate 25 to rotate with case 10.

The operation of the first embodiment of the present invention, according to FIGS. 1-5, will now be described hereinbelow in detail.

When the vehicle provided with the differential gear mechanism according to the present invention moves straight ahead, the case 10, the pinion gears 16, and both side gears 13 and 14 are integrally rotated. However, the outer clutches 22 and the innter clutches 23 of clutches 24 are not slid against each other, there is no relative rotation between pressure plates 25 and 26, and the camming operation as a result of contacting the cam portion 34 is not performed. At this state, the driving force is transmitted from the case 10 to the axle shafts (not shown) through means of the pinion shaft 15, pinion gears 16, and the side gears 13, 14.

When the vehicle is turned, a rotational difference occurs between the side gears 13 and 14 so as to thereby generate a sliding operation of clutches 24 held between the pressure plates 25 and 26 and the case 10. In this state, it is pre-established that the engaging force of the outer and inner clutches 22 and 23 occurs as a result of the sliding of the clutches 24 under the influence of the biasing force of the pre-load spring 29 under such normal turning of the vehicle, and that the clutches 24 are not engaged by means of the thrust force of the camming operation. That is, the differential gear operation of the side gears 13 and 14 is not obstructed by means of the sliding operation of clutches 24 under normal turning of the vehicle.

When the vehicle wheel of one of the axle shafts, not shown, encounters mud, sand, or the like, that is, the same encounters a slippery road surface, such vehicle wheel starts to race by slipping. The slipping vehicle wheel therefore starts to race in vain, and the vehicle cannot run, even if the other vehicle wheel is capable of obtaining sufficient frictional torque with the road surface.

When such relative rotation, however, occurs between the side gears 13 and 14 of this invention, frictional torque is generated in the clutches 24 by means of the pre-load force of pre-load spring 29 and the thrust force generated at the engaging portions of the pinion gears 16 and the side gears 13 and 14, although it is noted that when considerable frictional torque is produced by the thrust force, the pre-load force of spring 29 is negligible, and the end portions 25a and 26a of pressure plates 25 and 26 are relatively rotated so as to thereby develop camming operation at the cam portion 34. Accordingly, the clutches 24 are further strongly biased by means of the thrust forces by means of the pressure plates 25 and 26, and the engaging operation of clutches 24 is further increased.

The increased engaging force of clutches 24 acts upon the side gears so as to limit the racing operation of the slipping wheel and its side gear which has also started to race by slipping, and also acts upon the other side gear so as to rotate the same with the case 10. Therefore, the other vehicle wheel of which rotation has stopped, or is likely to have been stopped by racing of the vehicle wheel, again begins to rotate, thereby recovering the running ability of the vehicle.

Referring now to FIGS. 6–10, a different embodiment from that of FIGS. 1–5 will now be described hereinbelow in detail.

Figure 7:
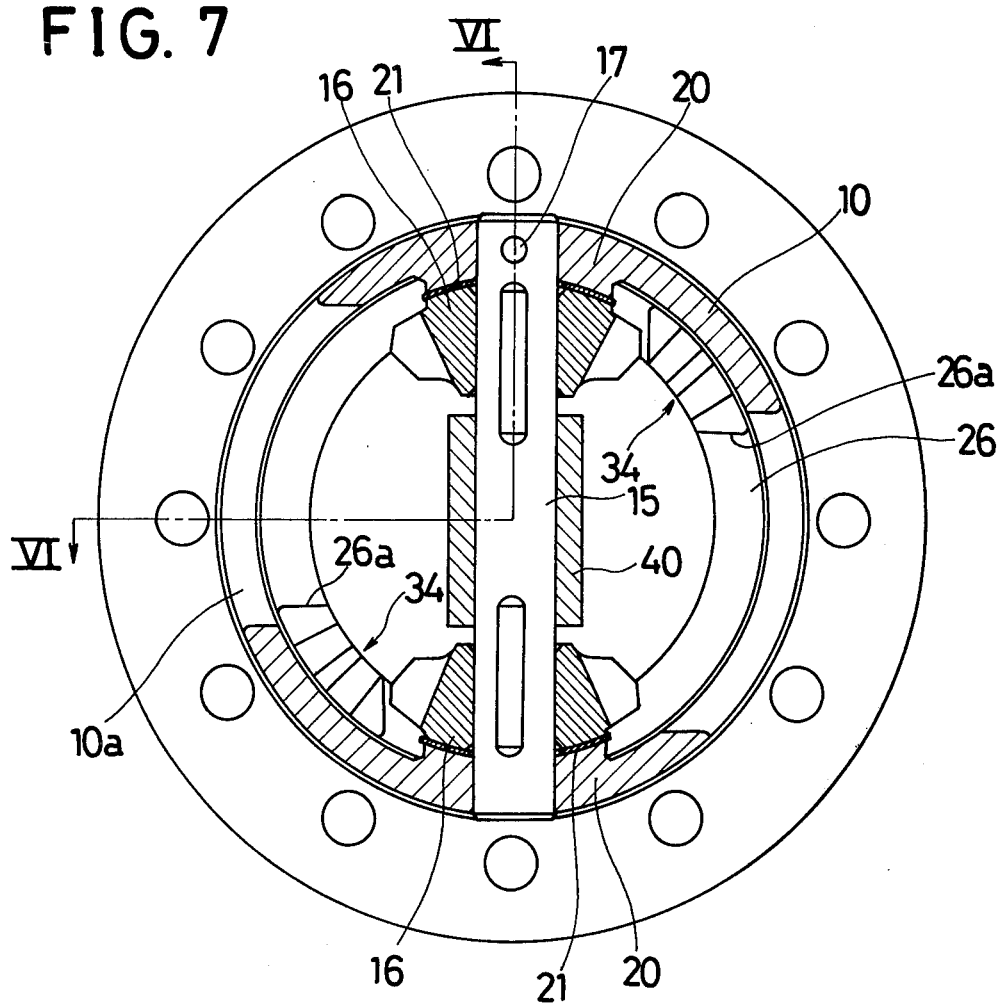
FIG. 7 is a view similar to that of FIG. 1 and taken along the line VII—VII of FIG. 6.
Figure 9:
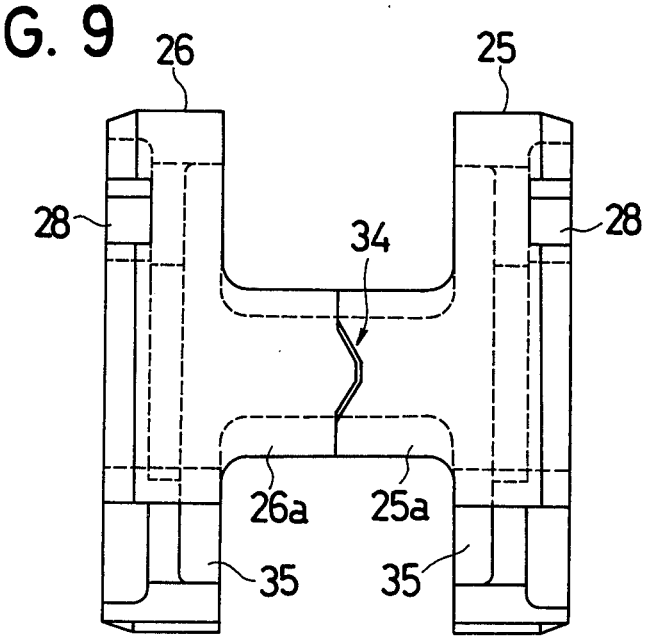
FIG. 9 is a view similar to that of FIG. 4.

The side gears 13 and 14 are engaged with axle shafts 36 and 37 through means of the splines 18 and 19, respectively. Snap rings 38 and 39 are fixedly inserted into the outer circumferential portion of axle shafts 36 and 37 and the inner peripheral portions of side gears 13 and 14 to prevent the axle shafts 36 and 37 from coming out of the case 10. A cylindrical spacer 40 is rotatably mounted upon the pinion shaft 15 and the amount that the axle shafts 36 and 37 can be moved into the case 10 is limited by means of the contact between spacer 40 and the axle shafts 36 and 37. The end portions 25a and 26a are in contact with each other, as seen in FIG. 7, so as not to impress the force of the pre-load spring 29 upon the side gears 13, 14. Accordingly, the pinion gears 16 are not moved leftwardly and rightwardly by means of the side gears 13 and 14 and it is easy to remove the pinion shaft 15 and the spacer 40 from the case 10 and to reconstruct the same within the case 10 thereafter.

When the abovementioned differential gear mechanism is attached to the vehicle wheels, the snap rings 38 and 39 are fixedly attached to the axle shafts 36 and 37 in advance so that the pinion shaft 15 and the spacer 40 are temporarily removed from the case 10 and thereafter reconstructed. Accordingly, the case 10 is provided with a recessed portion 10a to facilitate such operation.

The operation according to FIGS. 6–10 is similar to that of FIGS. 1–5, and consequently, a detailed description of the operation according to FIGS. 6–10 is omitted herefrom.

Obviously, many modifications and variations of the present invention are possible in light of the above teachings. It is to be understood therefore, that within the scope of the appended claims, the present invention may be practiced otherwise than as specifically described herein.

What is claimed as new and desired to be secured by Letters Patent of the United States is:

1. A differential gear mechanism for vehicles, comprising:
   an axle shaft;
   a case rotated by means of the driving force from an engine;
   a pinion shaft perpendicularly intersecting the rotational axis of said case and being fixed thereto;
   at least one pair of pinion gears rotatably supported upon said pinion shaft and supported by said case;
   a pair of side gears disposed within said case and enmeshed with said pair of pinion gears at both sides thereof for transmitting the driving force to said axle shaft;
   a pair of pressure plates disposed exteriorly of said pair of side gears and slidably engaged with an inner peripheral face of said case at the outer peripheral face thereof, and in addition, supporting said pair of side gears and having a cam portion which is formed by end portions thereof which extend inwardly of said case from the outside of said side gears wherein said cam portion is located between said pair of pinion gears and is circumferentially mounted with respect thereto; and
   clutch means interposed between said pair of pressure plates and the inner side of said case, and engaged with said pair of side gears at the inner side thereof and with said pair of pressure plates at the outer side thereof.

2. A differential gear mechanism for vehicles as set forth in claim 1, further comprising:
   a pre-load spring interposed between said clutch means and said inner side of said case.

3. A differential gear mechanism for vehicles as set forth in claim 2, wherein:
   said end portions of said pair of pressure plates are in contact with each other.

* * * * *